US 12,402,093 B2

United States Patent
Kolych et al.

(10) Patent No.: US 12,402,093 B2
(45) Date of Patent: Aug. 26, 2025

(54) CO-LOCATED MULTI-RADIO OR DEVICE AOA

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 290 days.

(21) Appl. No.: 18/146,177

(22) Filed: Dec. 23, 2022

(65) Prior Publication Data

US 2024/0214959 A1 Jun. 27, 2024

(51) Int. Cl.
*H04W 56/00* (2009.01)
*G01S 3/46* (2006.01)

(52) U.S. Cl.
CPC ............. *H04W 56/004* (2013.01); *G01S 3/46* (2013.01)

(58) Field of Classification Search
CPC ........ H04W 56/004; G01S 3/46; G01S 3/043; G01S 3/48
See application file for complete search history.

(56) References Cited

U.S. PATENT DOCUMENTS

| | | | |
|---|---|---|---|
| 2007/0192048 A1* | 8/2007 | Hu ...................... | H04L 27/0014 702/89 |
| 2012/0155890 A1* | 6/2012 | Zhou ................... | H04B 10/6165 398/208 |
| 2016/0295535 A1* | 10/2016 | Jose .................... | H04W 56/003 |
| 2016/0334498 A1* | 11/2016 | Jamieson ............ | G01S 5/02213 |
| 2017/0227623 A1* | 8/2017 | Park .................... | G01S 3/46 |
| 2018/0035256 A1* | 2/2018 | Prevatt ................ | G01S 5/14 |
| 2018/0267131 A1* | 9/2018 | Simileysky .......... | H04W 4/026 |
| 2020/0386844 A1* | 12/2020 | Park .................... | G01S 3/18 |
| 2022/0050162 A1* | 2/2022 | Zand .................... | H04W 4/023 |
| 2024/0214959 A1* | 6/2024 | Kolych ............... | H04W 56/004 |

* cited by examiner

Primary Examiner — Benjamin H Elliott, IV

(57) ABSTRACT

Techniques are disclosed to determine AoA of signals using co-located single-antenna radios such as BLE and Wi-Fi radios usually found in a wireless device. The co-located radios may have separate voltage controlled oscillators (VCO) that are not phase synchronized. The disclosed techniques use an internal path connecting the two radios through a RF switch under the control of a switch controller to allow the radios to synchronize or to compensate for their oscillator phase offset. The radios may use the RF switches of the internal path and RF switches between the radios and their antennas to sequence through an incident phase measurement stage to measure the phase difference of an incident signal received concurrently by the antennas and a radio synchronization stage to measure their oscillator phase offset to estimate the AoA of an incident signal. During the radio synchronization stage, the two radios are coupled through the internal path.

17 Claims, 12 Drawing Sheets

CO-LOCATED MULTI-RADIO OR DEVICE AOA

TECHNICAL FIELD

The subject matter relates to the field of wireless connectivity solutions. More specifically, but not by way of limitation, the subject matter discloses techniques for estimating the direction of a source of radio frequency signals by estimating the Angle of Arrival (AoA) of the signals using phase-based techniques.

BACKGROUND

AoA typically refers to an angle between a source antenna and a group or array of multiple receiving antennas. Receiving devices can estimate the position of the source antenna by estimating the AoA and the distance from the source antenna based on a radio frequency (RF) signal emitted by the source antenna. Existing designs and techniques for estimating AoA face various challenges such as backward compatibility issues and demands to reduce cost, footprint, and power consumption.

BRIEF DESCRIPTION OF THE DRAWINGS

The described embodiments and the advantages thereof may best be understood by reference to the following description taken in conjunction with the accompanying drawings.

These drawings in no way limit any changes in form and detail that may be made to the described embodiments by one skilled in the art without departing from the spirit and scope of the described embodiments.

DETAILED DESCRIPTION

Figure 1:
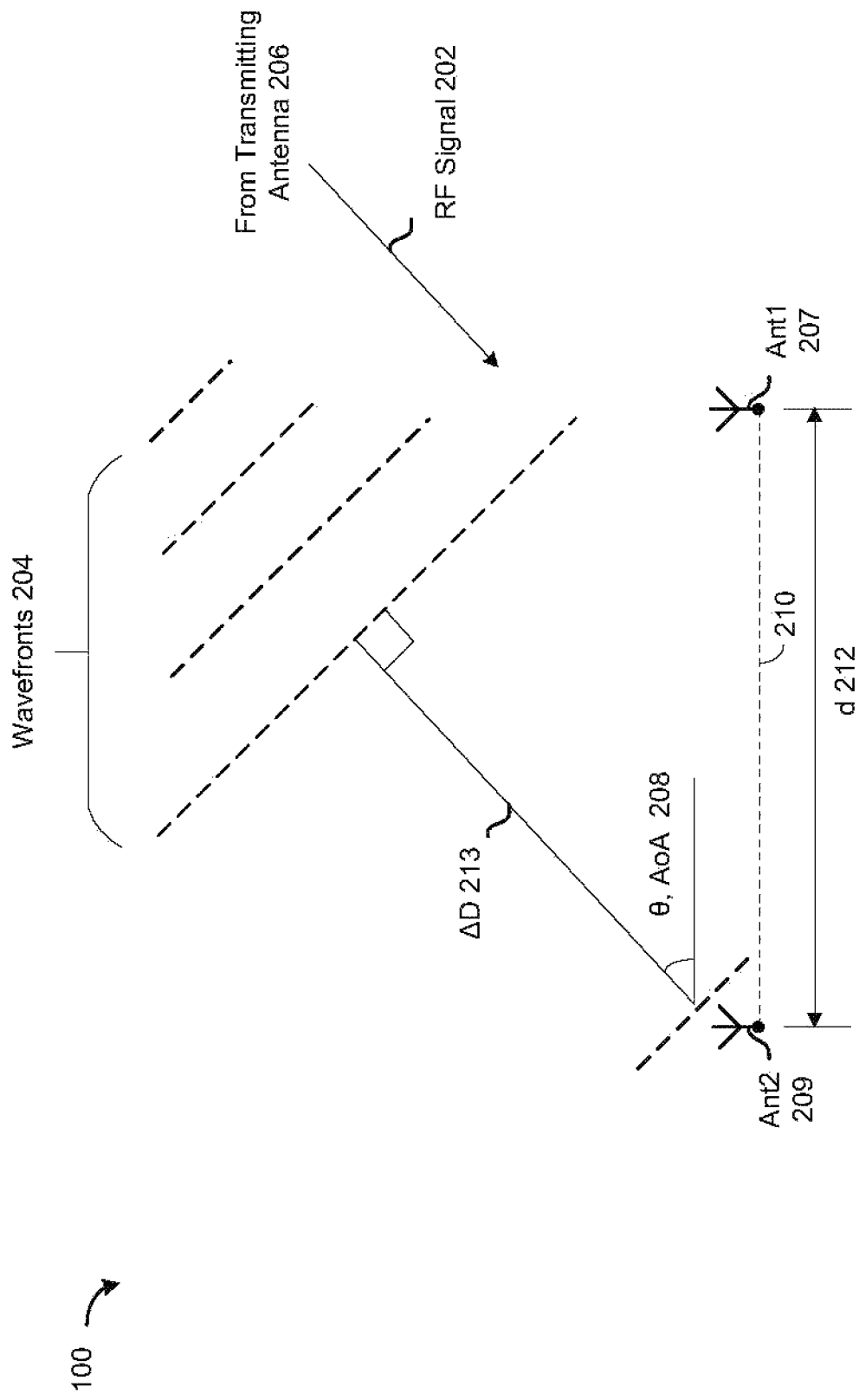
FIG. 1 illustrates a wave propagation model for determining AoA of a signal, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Estimating Angle of Arrival (AoA) of a signal using phase-based techniques is a localization approach used in many applications. For example, High Accuracy Distance Measurement (HADM) applications or Passive Entry Passive Start (PEPS) applications that provide secured entry and access to personal properties or restricted areas using narrow-band radios such as Bluetooth Low Energy (BLE) or IEEE 802.15.4 may utilize AoA of signals. In these applications, a receiver may measure AoA and received signal strength indicator (RSSI) information of signals transmitted from a remote digital key to estimate the position of the key.

AoA estimation may be performed by a BLE or Wi-Fi receiver having multiple antennas by measuring the I/Q quadrature samples of the signal received by the antennas and calculating the phase difference between the I/Q samples to estimate the angle of the incident wave. Some wireless devices with AoA capability may use multiple synchronized radio transceivers to receive incident signals from separate antennas (e.g., referred to as multi-radio devices). For example, a 2×2 multiple-input-multiple-output (MIMO) Wi-Fi receiver may have two synchronized radios with two antennas. However, having multiple radios increases the size, complexity, power consumption, and cost of the device. On the other hand, some wireless devices may use switching circuitry to couple its single transceiver (e.g., single-radio) to multiple antennas, one at a time, which can result in reduced size, complexity, and power consumption compared to multi-radio solutions. However, switching among multiple antennas may decrease the time for capturing the I/Q samples, potentially decreasing the accuracy of the AoA estimates.

Described herein are various aspects of techniques to determine AoA of signals using co-located single-antenna radios such as BLE and Wi-Fi radios usually found in a wireless device. The co-located radios are designed to operate with different wireless technologies or communication protocols (e.g., BLE and Wi-Fi) and are usually unsynchronized. For example, the two radios may have separate voltage controlled oscillators (VCO) that are not phase synchronized even if they are tuned to the same frequency. The disclosed solutions use an internal path connecting the two radios through a RF switch under the control of a switch controller to allow the radios to synchronize or to compensate for their oscillator phase offset. The radios may use the RF switches of the internal path and RF switches between the radios and their antennas to sequence through an incident phase measurement stage and a radio synchronization stage to estimate the AoA of an incident signal.

In one aspect, during the incident phase measurement stage, the two radios are coupled to their respective antennas to measure the phase difference of an incident signal received concurrently by the antennas. The measured phase difference due to the spatial diversity of the antennas may include an unknown phase offset between the two VCOs. During the radio synchronization stage, the two radios are coupled through the internal path to measure their oscillator phase offset. The radios may compensate the phase difference measured during the incident phase measurement stage for the oscillator phase offset measured during the synchronization stage to estimate the AoA of the incident signal. In one aspect, the order of sequencing between the two stages may be arbitrary to allow flexibility in estimating AoA.

In PEPS applications, a transmitter (e.g., a BLE transmitter) may transmit packets and constant tone signals over different carrier frequencies to the corresponding radio (e.g., a BLE radio, also referred to as a main radio) of a receiving device having co-located radios. In one aspect, during the incident phase measurement stage, the main radio may receive the constant tone of an incident signal through an antenna switch to measure the phase of the incident signal received by its antenna. The main radio may measure the phase by mixing the incident constant tone signal with a local oscillator (LO) generated by its VCO. The co-located radio (e.g., a Wi-Fi radio, also referred to as a secondary radio) may concurrently receive the constant tone signal through its corresponding antenna switch to measure the phase of the incident signal received by its antenna. The secondary radio may similarly measure the phase by mixing the incident constant tone signal with a LO generated by its VCO. A phase difference between the phase measurements made by the two radios may include the phase difference due to the spatial diversity of the two antennas and an unknown phase offset between the unsynchronized VCOs of the main and secondary radios.

During the radio synchronization stage, the switch controller may open the antenna switches to decouple the radios from their antennas. The switch controller may close the switch of the internal path connecting the two radios to allow the main radio to transmit a synchronization tone signal to the secondary radio. The secondary radio may receive the synchronization tone signal to estimate or compensate for the oscillator phase offset so that the phase measurements made during the incident phase measurement stage may be used to estimate the AoA of the incident signal.

In one aspect, the synchronization tone signal may be the incident constant tone signal received by the main radio from the transmitter during the incident phase measurement stage. The secondary radio may receive the incident constant tone signal of the main radio through the internal path to measure its phase by mixing it with the LO generated by its VCO. The measured phase of this incident constant tone signal of the main radio may include the phase difference introduced by the internal path. Because the LO generated by the VCO of the secondary radio is used to measure both the phase of the incident constant tone signal received from the antenna of the secondary radio during the incident phase measurement stage and the phase of the incident constant signal received from the main receiver during the radio synchronization stage, by subtracting the two measured phases, the oscillator phase offset between the unsynchronized VCOs of the two radios may be compensated. The resulting difference between the two measured phases may include only the phase difference due to the spatial diversity of the two antennas and the phase difference introduced by the internal path. In one aspect, the phase difference introduced by the internal path may be predetermined or characterized to account for temperature sensitivity. The phase difference of the incident signal attributed to the spatial diversity of the two antennas may then be determined and used to estimate the AoA of the incident signal.

In one aspect, the synchronization tone signal may be a constant tone signal with a predetermined phase generated by the main radio. The secondary radio may receive the predetermined constant tone signal through the internal path to measure its phase by mixing it with the LO generated by its VCO. The measured phase of this constant tone signal may include the predetermined phase, the phase difference introduced by the internal path and the oscillator phase offset between the unsynchronized VCOs of the two radios. By having knowledge of the predetermined phase and the phase difference introduced by the internal path, the oscillator phase offset between the unsynchronized VCOs of the two radios may be estimated. The phase difference between the phase measurements made by the two radios during the incident phase measurement stage may then be compensated for the estimated oscillator phase offset to determine the phase difference of the incident signal attributed to the spatial diversity of the two antennas and the AoA of the incident signal. Advantageously, the disclosed solutions to estimate or compensate the oscillator phase offset between unsynchronized VCOs to estimate the AoA of an incident signal using co-located radios found in most wireless devices reduce size, complexity, power, and cost compared to multi-radio (e.g., dedicated transceiver per antenna) solutions and increase the accuracy of AoA estimates compared to single-radio solutions.

FIG. 1 illustrates a wave propagation model for determining AoA of a signal, in accordance with one aspect of the present disclosure. The RF signal/incoming pattern 202 in FIG. 1 is represented by isoplane wavefronts from a far-field transmitting antenna 206. FIG. 1 shows that the transmitting antenna 206 is at an angle θ, AoA 208 from the axis 210 of the antenna 1 207 and antenna 2 209, which are a distance, d 212 apart. The extra distance that the RF signal travels from antenna 1 207 to reach antenna 2 209 can be expressed as the path difference ΔD 213. By trigonometric identity, θ, AoA 208 is expressed as in the following equation (1):

$$\theta = \cos^{-1}\left(\frac{\Delta D}{d}\right) \quad \text{Equation (1)}$$

In some embodiments, ΔD 213 may be estimated by calculating the distance that the RF signal 202 (e.g., a wavefront) traveled (e.g., at the speed of light) between the time it arrived at antenna 1 207 and the time it arrived at antenna 2 209. These times of RF signal 202 arrival and speed of the RF signal 202 are examples of attributes of the RF signal 202 that may be used to estimate the AoA 208. The path difference ΔD 213 may also be expressed through other attributes of the RF signal 202, for example, as the following equation (2):

$$\Delta D = \frac{\lambda}{2\pi}(\varphi_{A2} - \varphi_{A1}) \quad \text{Equation (2)}$$

where λ is the wavelength of the RF signal 202 and $\varphi_{A1}$ and $\varphi_{A2}$ are phase values of the RF signal 202 antenna 1 207 and antenna 2 209, respectively.

λ can be expressed as in the following equation (3):

$$\lambda = \frac{c}{f} \quad \text{Equation (3)}$$

where f is the frequency of the RF signal 202 and c is the speed of light.

Substituting equation (3) into equation (2) above, with all other variables known, AoA 208 can be estimated by determining the phase difference, $\varphi_{A2} - \varphi_{A1}$ as illustrated in the following equation (4):

$$\theta = \cos^{-1}\left(\frac{c(\varphi_{A2} - \varphi_{A1})}{2\pi f d}\right) \quad \text{Equation (4)}$$

Thus, estimating the AoA 208 of the RF signal 202 may be based on estimating the phases of the RF signal 202 at multiple antenna elements. Due to the difference in propagation distances from the transmitting antenna 206, the antenna 1 207 and the antenna 2 209 observe a different phase of the RF signal 202. As shown, if the wavefronts 204 are assumed to propagate in parallel through space, the phase observed by antenna 1 207 will be $\varphi_{A1}$ and the phase observed by antenna 2 209 will be $\varphi_{A2}$. In some embodiments, the difference between $\varphi_{A1}$ and $\varphi_{A2}$ is the phase difference used to estimate AoA based, at least in part, on equation 4, and/or other relationships involving RF signal attributes that can be used to estimate the AoA 208.

Figure 2:
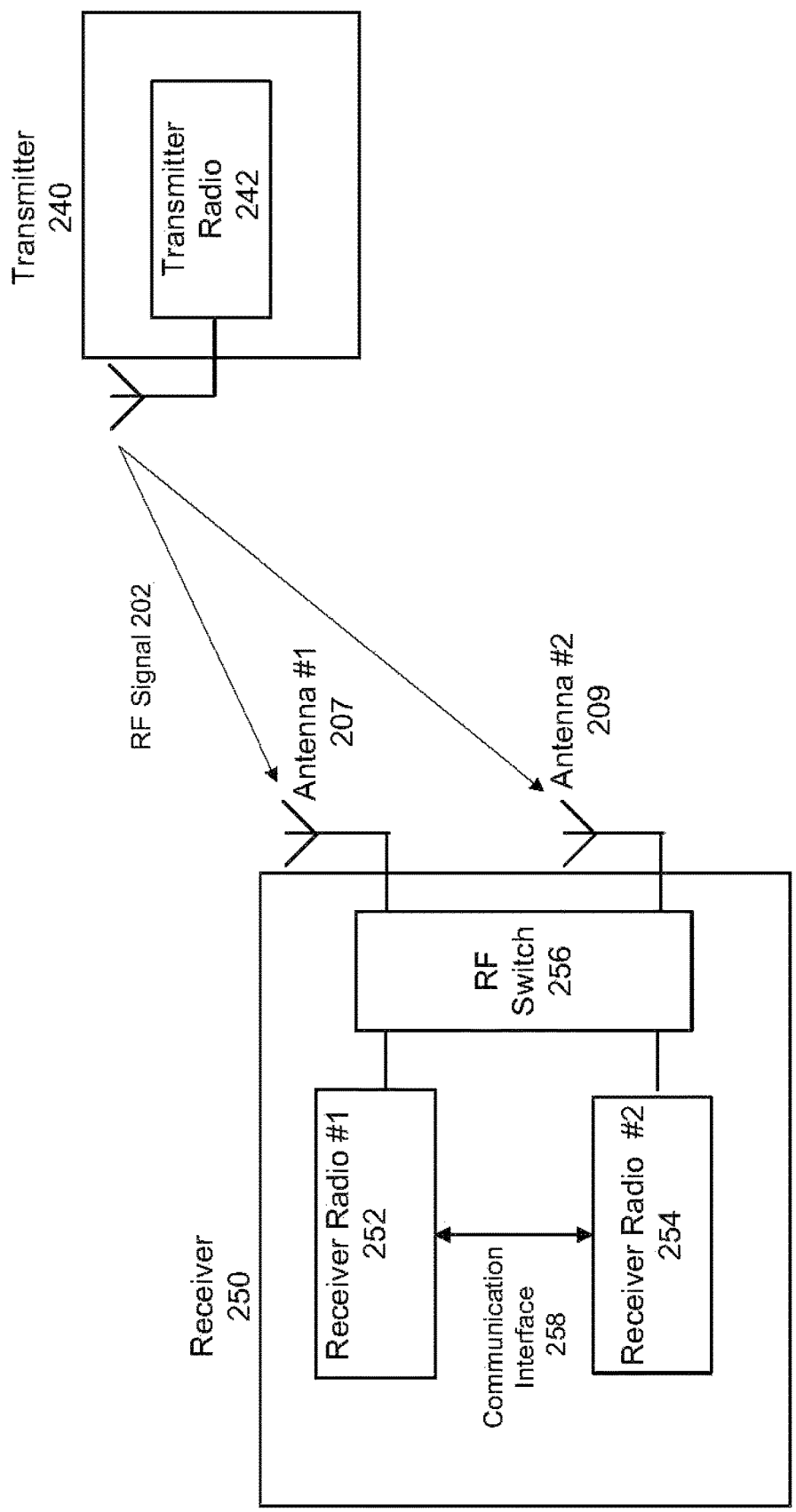
FIG. 2 illustrates a functional block diagram of a device leveraging two co-located unsynchronized radios and RF switch circuitry to synchronize between oscillators of the two radios for estimating AoA of a signal, in accordance with one aspect of the present disclosure.

FIG. 2 illustrates a functional block diagram of a device leveraging two co-located unsynchronized radios and RF switch circuitry to synchronize between oscillators of the two radios for estimating AoA of a signal, in accordance with one aspect of the present disclosure.

A transmitter 240 and a wireless receiver 250 are connected within a Wireless Personal Area Network (WPAN), a Wireless Local Area Network (WLAN), or any other wireless networks. For example, transmitter 240 may have a narrow-band radio 242 configured to transmit RF signals 202 in Bluetooth, Bluetooth Low Energy (BLE), ZigBee, or Wi-Fi networks having frequencies in the Industrial, Scientific, and Medical (ISM) band. Receiver 250 may have a narrow-band radio #1 252 configured to receive the RF signals 202 through antenna #1 207. RF signals 202 (e.g., the carrier waves) may be a constant tone signal or may be modulated to encode messages and/or to define patterns, either streamed or packetized, of a first communication protocol or radio access technology.

Receiver 250 may have another narrow-band radio #2 254 configured to receive RF signals through antenna #2 209 using a second communication protocol or radio access technology different from that of radio #1 252. For example, radio #1 252 may be a BLE radio while radio #2 254 may be a Wi-Fi radio sharing the ISM band. Radio #1 252 and radio #2 254 may be two separate devices on receiver 250 or may be a single device with two radios (e.g., combo chip with BLE and Wi-Fi capabilities). Radio #2 254 may receive RF signals transmitted by a transmitter (not shown) using the second communication protocol. While radio #2 254 may not be able to demodulate and decode packetized data of the first communication protocol sent by transmitter 240, radio #2 254 may be able to receive a constant tone signal sent by transmitter 240 for AoA estimation in secure phase-based ranging applications.

In one aspect, receiver 250 may leverage antenna #2 209 of radio #2 254 and the known distance between antenna #1 207 and antenna #2 209 to estimate the AoA of a constant tone RF signal 202 from transmitter 240 using Equation 4. However, because radio #1 252 and radio #2 are designed to work with different radio access technologies, the two radios are not synchronized (e.g., VCOs of the two radios are not phase synchronized even if they are tuned to the same frequency). While radios may be synchronized through antennas using VCO synchronization techniques, the techniques suffer from environmental effect. For example, multipath reflections from neighboring objects may distort the phase of received signals.

A technique is disclosed to characterize an oscillator phase offset between the VCOs of the two synchronized radios to enable AoA estimation. In one aspect, receiver 250 may have an RF switch 256 to provides an internal path between radio #1 252 and radio #2 252 to estimate or compensate for their oscillator phase offset. The internal path is not distorted by channel effect. In one aspect, radio #1 252 may transmit a synchronization tone signal to radio #2 254 through RF switch 256 for radio #2 254 to measure the phase of the received synchronization tone signal. The phase of the synchronization tone signal measured by radio #2 254 at a particular time instance contains information on the phase of the VCO of radio #2 254 at that time instance. The measured phase may be used with information on a reference phase of the synchronization tone signal transmitted from radio #1 252 to estimate the oscillator phase offset between the VCOs of radio #1 252 and radio #2 254 or to compensate a measured phase difference of RF signal 202 received concurrently by radio #1 252 and radio #2 254 for the estimated oscillator phase offset. In one embodiment, radio #2 254 may communicate the measured phase of the synchronization tone signal, the estimated oscillator phase offset, or the measured phase difference of RF signal 202 compensated for the estimated oscillator phase offset to radio #1 252 through a communication interface 258 to allow radio #1 252 to estimate the AoA of RF signal 202.

Radio #1 252 may also control radio #2 254 to perform phase measurements through communication interface 258. In one embodiment, phase measurements or the estimated oscillator phase offset may be communicated from radio #2 254 to radio #1 252 using the internal path.

Figure 3:
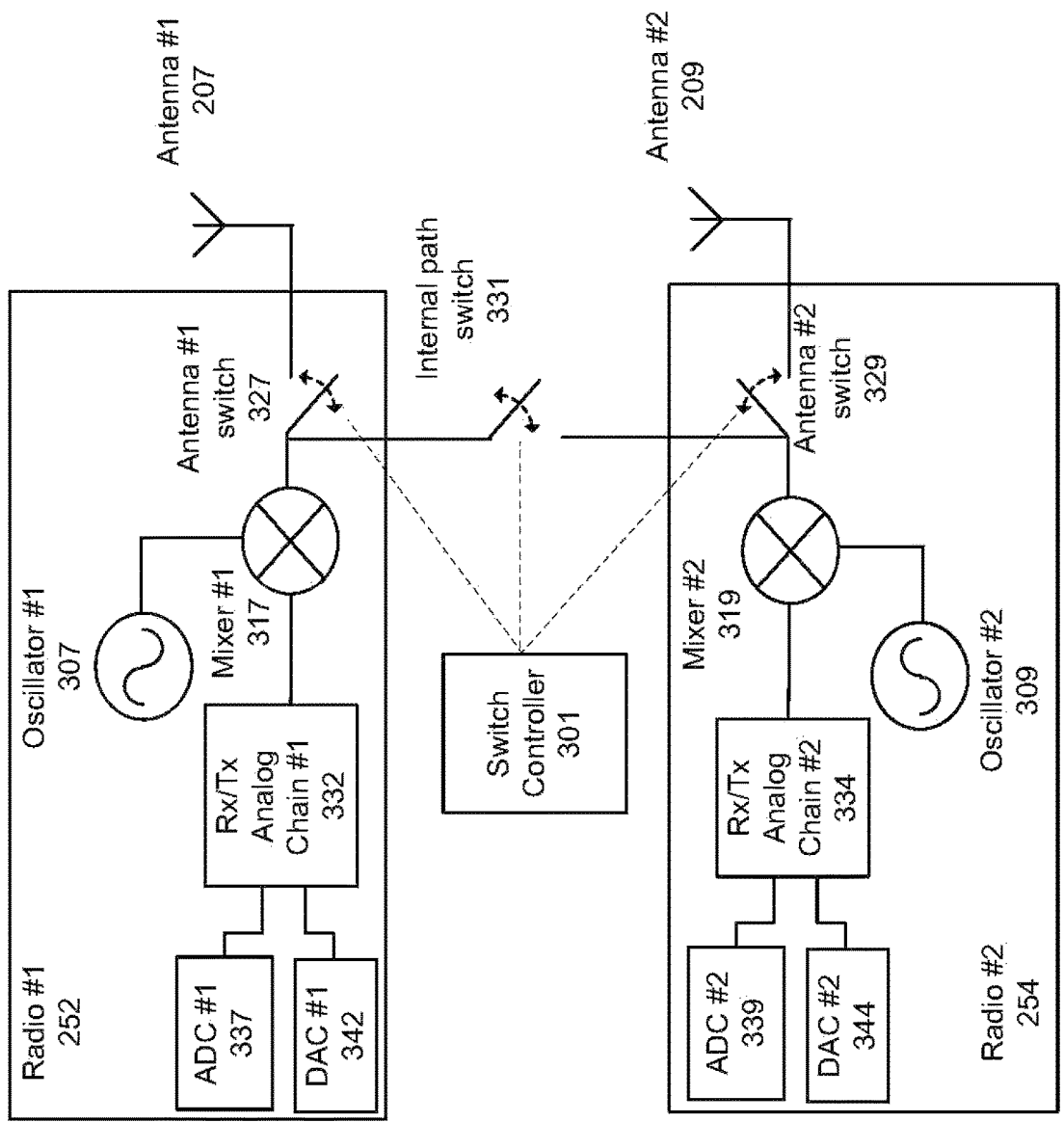
FIG. 3 illustrates a functional block diagram of two unsynchronized radios coupled to antenna switches and an internal path switch that may be controlled to estimate AoA of a signal, in accordance with one aspect of the present disclosure.

FIG. 3 illustrates a functional block diagram of two unsynchronized radios coupled to antenna switches and an internal path switch that may be controlled to estimate AoA of a signal, in accordance with one aspect of the present disclosure. Radio #1 252 may have an oscillator #1 307 (e.g., VCO) that generates an LO for a mixer #1 317 to down-convert incident RF signals received by antenna #1 207. The down-converted signals may be filtered, amplified, shaped, or processed by receive/transmit (Rx/Tx) analog chain #1 332 and digitized by an analog-to-digital converter (ADC) #1 337 to generate baseband digitized samples for phase measurements. In the transmit path, a digital-to-analog converter (DAC) #1 342 may convert digital samples of a baseband signal to an analog signal, which may also be filtered, amplified, shaped, or processed by Rx/Tx analog chain #1 332, and up-converted by mixer #1 317 to generate an RF signal for transmission through antenna #1 207 or to radio #2 254.

Similarly, radio #2 254 may have an oscillator #2 309 (e.g., VCO) that generates an LO for a mixer #2 319 to down-convert incident RF signals receiver by antenna #2 209. The down-converted signals may be filtered, amplified, shaped, or processed by Rx/Tx analog chain #2 334 and digitized by an analog-to-digital converter (ADC) #2 339 to generate baseband digitized samples for phase measurements. In the transmission path, a digital-to-analog converter (DAC) #2 344 may convert digital samples of a baseband signal to an analog signal, which may be filtered, amplified, shaped, or processed by Rx/Tx analog chain #2 334, and up-converted by mixer #2 319 to generate an RF signal for transmission through antenna #2 209.

Oscillator #1 307 and oscillator #2 309 are not synchronized so that even if the two LOs have the same frequency, there may be a phase offset between them. An internal path connects radio #1 252 and radio #2 254 to allow radio #1 252 or radio #2 254 to estimate the oscillator phase offset or to compensate phase difference of incident RF signals received by the two radios for the oscillator phase offset for estimating AoA of the incident RF signals. In one aspect, when radio #1 252 and radio #2 254 are in a single device, the internal path is fabricated within the device. In one aspect, when radio #1 252 and radio #2 254 are separate devices, the internal path may be fabricated as a micro strip line on a printed circuit board (PCB) or by other RF connections. The length of the internal path and the introduced phase delay to the RF signals may be characterized or constrained so that it does not change with time and is not distorted by channel effect, although it may vary with temperature.

Incident RF signals received by antenna #1 207 may be coupled to mixer #1 317 through an antenna #1 switch 327 and incident RF signals received by antenna #2 209 may be coupled to mixer #2 309. The internal path may couple the two radios through an internal path switch 331. A switch controller 301 may control antenna #1 switch 327, antenna #2 switch 329, and internal path switch 331 to allow the two radios to perform incident phase measurements or oscillator synchronization. For example, during the incident phase measurement stage, switch controller 301 may close antenna #1 switch 327 and antenna #2 switch 329 to couple the incident RF signals to their respective mixers to allow the two radios to measure the phase of the incident RF signals. The internal path switch 331 is open to uncouple the two radios during the incident phase measurement stage.

During the radio synchronization stage, switch controller 301 may open antenna #1 switch 327 and antenna #2 switch 329 to decouple the two radios from their respective antennas, and to close internal path switch 331 to connect the two radios to allow radio #1 252 or radio #2 254 to estimate or compensate the oscillator phase offset. Switch controller 301 may be separate from the two radios or may be integrated inside the device that contains one or both of the radios.

Figure 4:
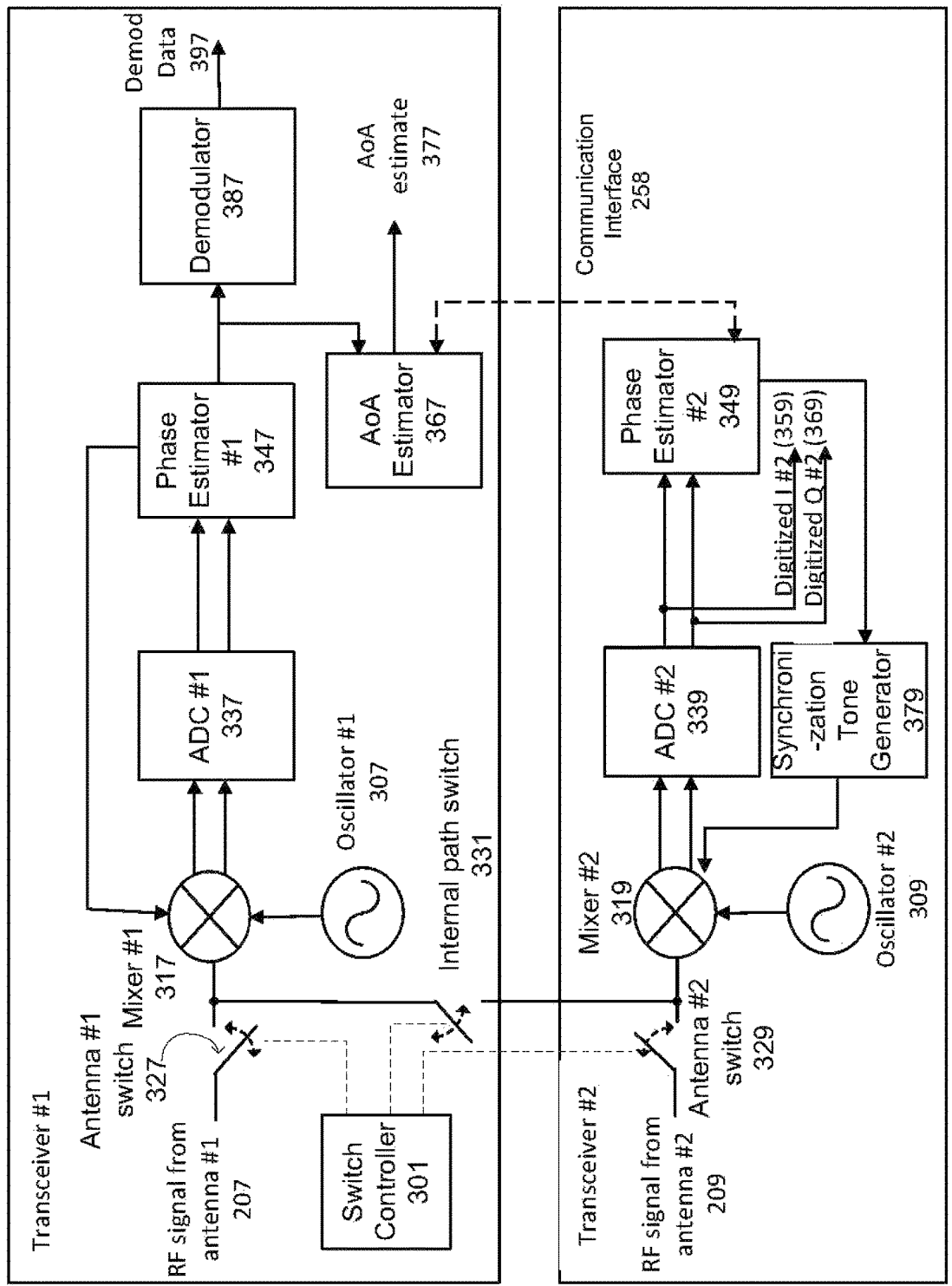
FIG. 4 illustrates a functional block diagram of the receivers of two unsynchronized radios coupled to antenna switches to make phase measurements of an incident RF signal and an internal path switch coupled between the two receivers to measure their oscillator phase offset for estimating AoA of the signal, in accordance with one aspect of the present disclosure.

FIG. 4 illustrates a functional block diagram of the transceivers of two unsynchronized radios coupled to antenna switches to make phase measurements of an incident RF signal and an internal path switch coupled between the two transceivers to measure their oscillator phase offset for estimating AoA of the signal, in accordance with one aspect of the present disclosure. Transceiver #1 may contain the main radio of a first wireless technology (e.g., BLE) receiving constant tone signals in one or more carrier frequencies in secure phase-based ranging applications. Transceiver #2 may contain the co-located secondary radio of a second wireless technology (e.g., Wi-Fi) that is leveraged by transceiver #1 to receive the constant tone signals transmitted by a transmitter of the first wireless technology for AoA estimation. The first wireless technology and the second technology may transmit and receive using different communication protocols.

As discussed, the switch controller 301 may close antenna #1 switch 327 and antenna #2 switch 329 to couple the incident RF signal from antenna #1 207 and from antenna #2 209 to mixer #1 317 and mixer #2 319 of the two transceivers, respectively, during the incident phase measurement stage. Switch controller 301 may open the internal path switch 331 to decouple the two transceivers during the incident phase measurement stage. In one aspect, there may be additional RF switches under the control of switch controller 301 to decrease parasitic effects. In one aspect, transceiver #1 and transceiver #2 may have additional elements, attenuators, couplers, or matching circuits to provide correct impedance matching and signal power during the incident phase measurement stage or the radio synchronization stage.

Mixer #1 may down-convert the RF signal received by antenna #1 207 to a baseband signal (or an intermediate frequency) using the local oscillator signal (LO) generated by oscillator #1 307 of transceiver #1 to generate a down-converted quadrature signal for transceiver #1. Similarly, mixer #2 may down-convert the RF signal received by antenna #2 209 to a baseband signal (or an intermediate frequency) using the local oscillator signal (LO) generated by oscillator #2 309 of transceiver #2 to generate a down-converted quadrature signal for transceiver #2. Oscillator #1 307 and oscillator #2 309 may be VCOs.

In transceiver #1, an analog-to-digital converter (ADC) #1 337 may sample the down-converted quadrature signal to generate digitized quadrature samples. A phase estimator #1 347 may determine a series of the phase of the digitized quadrature samples (referred to as the measured phase samples of transceiver #1). When the RF signal is packetized data instead of a constant tone signal, a demodulator 387 may demodulate the measured phase samples and/or sampled amplitude of the digitized quadrature samples (not shown) for subsequent data processing.

Analogously, in transceiver #2, an analog-to-digital converter (ADC) #2 339 may sample the down-converted quadrature signal to generate digitized quadrature samples (e.g., digitized I #2 359 and digitized Q #2 369). The digitized quadrature samples may be provided to baseband circuitry of transceiver #2 for further processing when transceiver #2 is receiving modulated data from a transmitter of the second wireless technology instead of the constant tone signals transmitted by a transmitter of the first wireless technology. A phase estimator #2 349 may determine a series of the phase of the digitized quadrature samples (referred to as the measured phase samples of transceiver #2). In one aspect, transceiver #2 may send its measured phase samples to transceiver #1 through a communication interface 258. Transceiver #1 may also command transceiver #2 to measure phase samples through communication interface 258.

An AoA estimator 367 of transceiver #1 may determine the phase difference between the measured phase samples of transceiver #1 and the measured phase samples of transceiver #2. The measured phase difference may include an unknown oscillator phase offset between unsynchronized oscillator #1 307 and oscillator #2 309 in addition to any phase difference of the incident RF signal attributable to the spatial diversity of antenna #1 207 and antenna #2 209. To estimate AoA of the incident RF signal, AoA estimator 367 may estimate the oscillator phase offset between oscillator #1 307 and oscillator #2 309 during the radio synchronization stage or may compensate the phase difference of the incident RF signal measured during the incident phase measurement stage for the oscillator phase offset. AoA estimator 367 may generate AoA estimate 377 based on the compensated phase difference.

During the radio synchronization stage, switch controller 301 may open antenna #1 switch 327 and antenna #2 switch 329 to decouple mixer #1 317 and mixer #2 319 from antenna #1 and antenna #2, respectively, and may close internal path switch 331 of the internal path to connect the two transceivers. Transceiver #1 may generate a synchronization tone signal to transceiver #2 through internal path switch 317. In one embodiment, the synchronization tone signal may be the measured phase samples of transceiver #1 during the incident phase measurement stage. Mixer #2 319 may mix the synchronization tone signal with the LO from oscillator #2 309 to generate a down-converted quadrature synchronization tone signal. ΔDC #2 339 may digitize the down-converted quadrature synchronization tone signal. Phase estimator #2 329 may determine the phase samples of the digitized down-converted quadrature synchronization samples, which may then be sent to transceiver #1 through the communication interface 258 to compensate the measured phase difference between transceiver #1 and transceiver #2 for the oscillator phase offset. In one embodiment, a synchronization tone generator 379 of transceiver #2 may generate a constant tone signal with a predetermined phase as the synchronization tone signal during the radio synchronization stage. The synchronization signal may be transmitted to transceiver #1 through the internal path for transceiver #1 to estimate the oscillator phase offset. In one embodiment, transceiver #1 may communicate the predefined phase of the constant tone signal to transceiver #2 through communication interface 258 for synchronization tone generator 379 of transceiver #2 to generate the synchronization signal.

Figure 5:
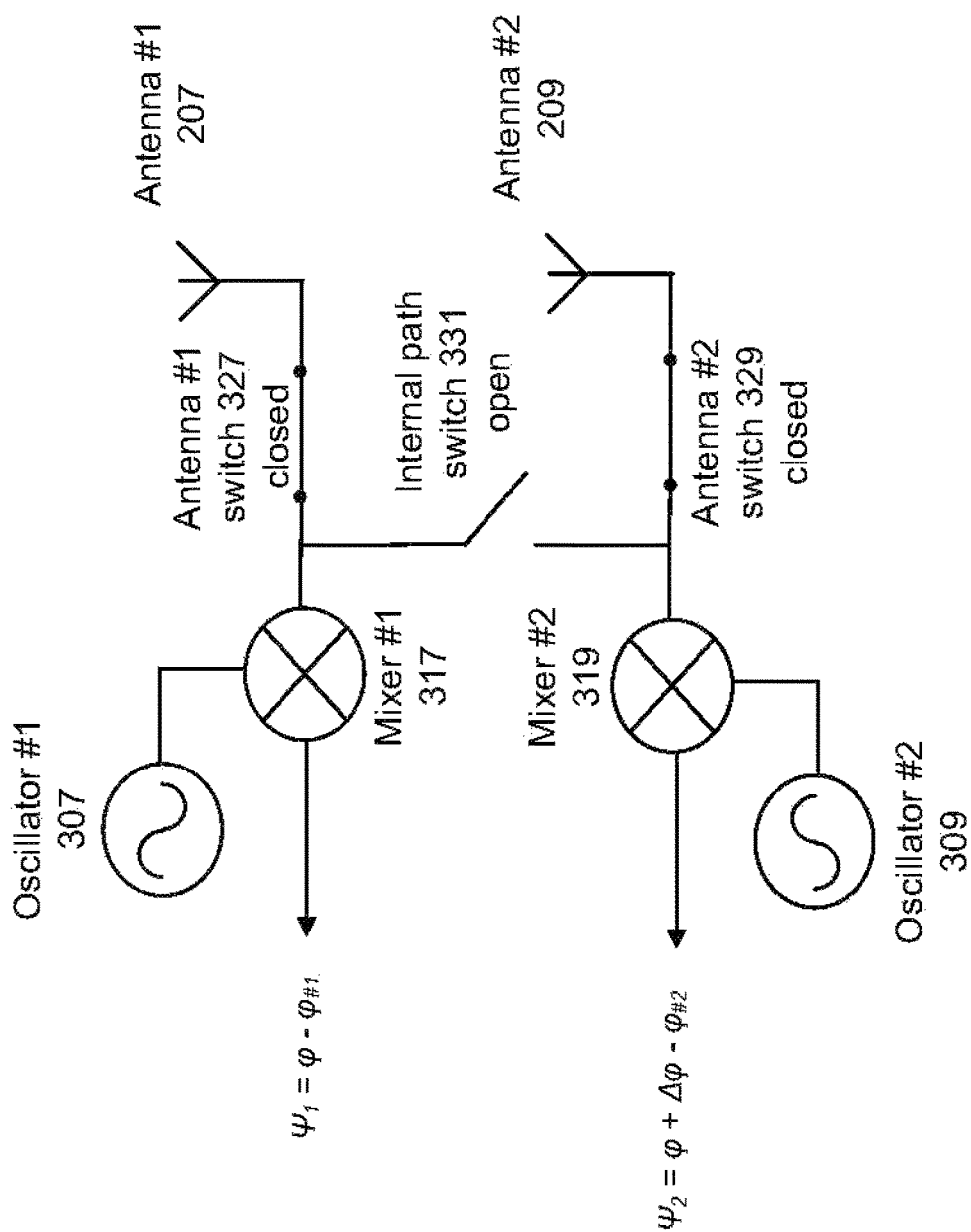
FIG. 5 illustrates a functional block diagram of two unsynchronized radios measuring phases of an incident wave received from their respective antennas during the incident phase measurement stage, in accordance with one aspect of the present disclosure.

FIG. 5 illustrates a functional block diagram of two unsynchronized radios measuring phases of an incident wave received from their respective antennas during the incident phase measurement stage, in accordance with one aspect of the present disclosure. The two radios may be the main radio and the secondary radio of the two transceivers of FIG. 4.

In the main radio, mixer #1 317 mixes the RF signal received by antenna #1 207 when antenna #1 switch 327 is closed with the LO generated by oscillator #1 307 to generate the down-converted signal with phase represented by:

$$\psi_1 = \varphi - \varphi_{\#1} \quad \text{(Equation 5)}$$

where φ is the phase of the incident constant tone signal, $\varphi_{\#1}$ is the phase offset of the LO from oscillator #1 307, and $\psi_1$ is the measured phase of the down-converted signal. $\psi_1$ may represent the measured phase samples of the constant tone signal measured by phase estimator #1 347 of receiver #1 of FIG. 4. Also, it is assumed that phase changes caused by signal propagation from antenna #1 207 through analog and digital chains (e.g., Rx/Tx analog chain #1 332) are correctly compensated for receiving as well as for transmitting signals. However, the internal path delay is considered and compensated separately.

In the secondary radio, mixer #2 319 mixes the RF signal received by antenna #2 209 when antenna #2 switch 329 is closed with the LO generated by oscillator #2 309 to generate the down-converted signal with phase represented by:

$$\psi_2 = \varphi + \Delta\varphi - \varphi_{\#2} \quad \text{(Equation 6)}$$

where Δφ is the phase difference between antenna #1 207 and antenna #209, and P #$_2$ is the phase offset of the LO from oscillator #2 309. O$_2$ may represent the measured phase samples of the constant tone signal measured by phase estimator #2 349 of receiver #2 of FIG. 4

The oscillator phase offset $\Delta\varphi_{\#1-\#2}$ between oscillator #1 307 and oscillator #2 309 may then be represented by:

$$\Delta\varphi_{\#1-\#2} = \varphi_{\#1} - \varphi_{\#2} \quad \text{(Equation 7)}$$

The oscillator phase offset $\Delta\varphi_{\#1-\#2}$ is compensated during the radio synchronization stage. The phase difference between the phase samples measured by the main radio and the secondary radio may be represented by:

$$\psi_2 - \psi_1 = \Delta\varphi + \varphi_{\#1} - \varphi_{\#2} = \Delta\varphi + \Delta\varphi_{\#1-\#2} \quad \text{(Equation 8)}$$

Figure 6:
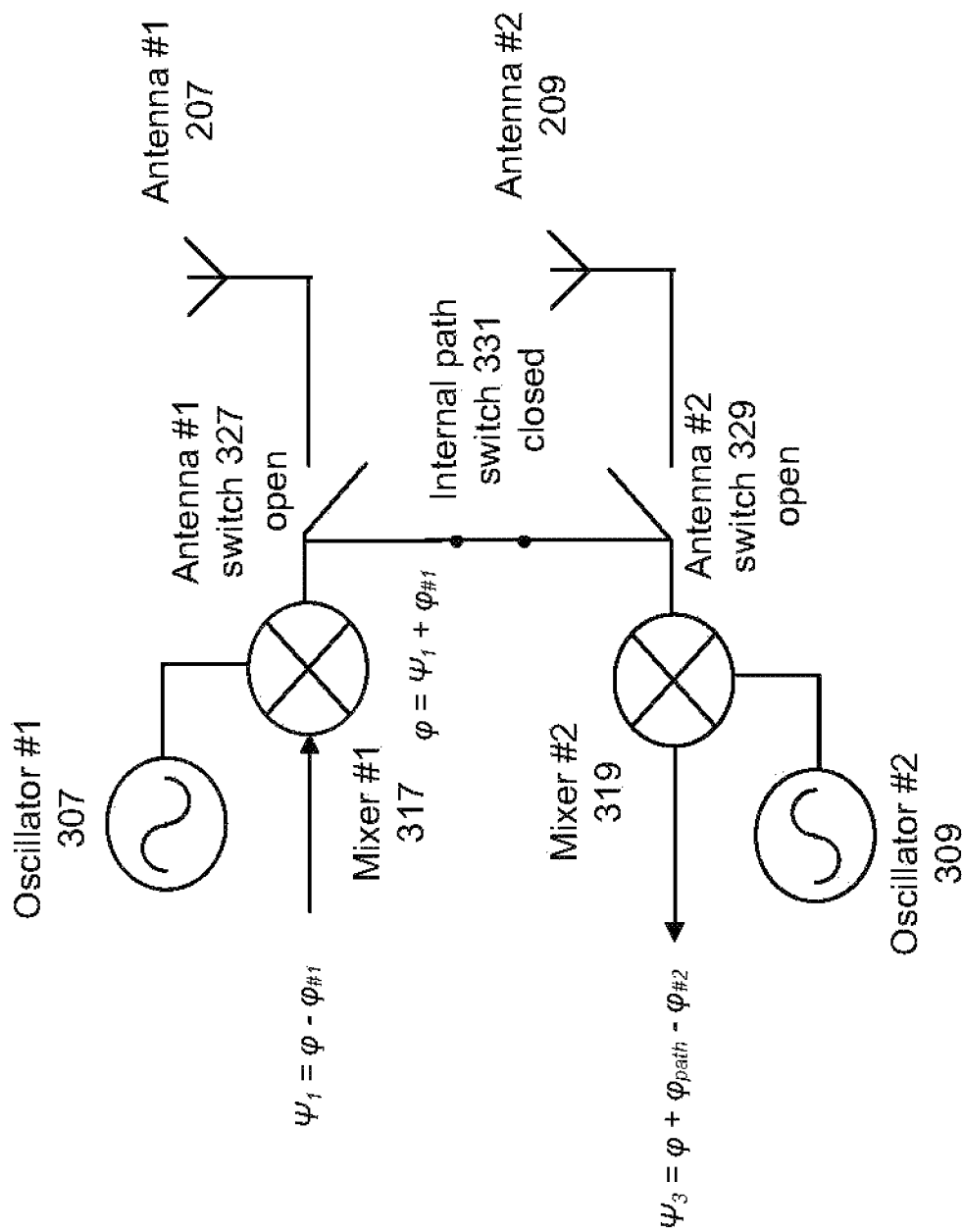
FIG. 6 illustrates a functional block diagram of two unsynchronized radios compensating their measured phase difference for the oscillator phase offset to estimate AoA of the incident RF signal when the two radios are coupled through an internal path switch through which one radio injects a synchronization tone signal containing the measured phase samples of the incident RF signal to the other radio during the radio synchronization stage, in accordance with one aspect of the present disclosure.

FIG. 6 illustrates a functional block diagram of two unsynchronized radios compensating their measured phase difference for the oscillator phase offset to estimate AoA of the incident RF signal when the two radios are coupled through an internal path switch through which one radio injects a synchronization tone signal containing the measured phase samples of the incident RF signal to the other radio during the radio synchronization stage, in accordance with one aspect of the present disclosure. The two radios may be the main radio and the secondary radio of the two receivers of FIG. 4.

During the radio synchronization stage, the main radio may inject the measured phase samples of the down-converted signal $\psi_1 = \varphi - \varphi_{\#1}$ of Equation (5) from the incident phase measurement stage as the synchronization tone signal back through mixer #1 317 to generate the up-converted synchronization tone signal with phase represented by:

$$\varphi = \psi_1 + \varphi_{\#1} \qquad \text{(Equation 9)}$$

In one aspect, phase estimator #1 347 of FIG. 4 may provide the synchronization tone signal by converting the phase samples of the incident RF signal measured by phase estimator #1 347 to an analog signal.

The up-converted synchronization tone signal flows through the closed internal path switch 331 of the internal path to the secondary radio. Mixer #2 319 mixes the up-converted synchronization tone signal with the LO generated by oscillator #2 309 to generate the measured tone synchronization signal with phase represented by:

$$\psi_3 = \varphi + \varphi_{path} - \varphi_{\#2} \qquad \text{(Equation 10)}$$

where $\varphi_{path}$ represents the phase delay introduced by the internal path, and $\varphi_{\#2}$ is again the phase offset of the LO from oscillator #2 309.

The phase difference between $\psi_2$ representing the phase samples of the incident constant tone signal measured by the secondary radio and $\psi_3$ representing the phase samples of the tone synchronization signal measured by the secondary radio is represented by:

$$\psi_2 - \psi_3 = \Delta\varphi - \varphi_{path} \qquad \text{(Equation 11)}$$

Equation 11 shows that this phase difference does not depend on the oscillator phase offset but only depends on the phase difference $\Delta\varphi$ between the two antennas and the phase delay $\varphi_{path}$ introduced by the internal path. In one aspect, $\varphi_{path}$ may be predetermined or characterized to account for temperature sensitivity as the length of the internal path varies with temperature. In one aspect, a temperature sensor may be placed near the internal path to measure the ambient temperature. The measured temperature may be used as an input to a lookup table to determine $\varphi_{path,0}$ corresponding to the temperature-dependent phase delay of the internal path.

The phase difference of the incident RF signal used for AoA estimation may be determined by subtracting the temperature-dependent internal path phase delay $\varphi_{path,0}$ from Equation 11 as represented by:

$$\psi_{AoA} = \Delta\varphi + \varphi_{path} - \varphi_{path,0} \qquad \text{(Equation 12)}$$

where $\psi_{AoA}$ represents the phase difference of the incident RF signal used for AoA estimation. If the internal path phase delay is compensated fully for its temperature dependency, $\varphi_{path} = \varphi_{path,0}$, and $\psi_{AoA}$ is equal to the phase difference of the incident signal between antenna #1 207 and antenna #2 209:

$$\psi_{AoA} = \Delta\varphi \qquad \text{(Equation 13)}$$

$\psi_{AoA}$ may be used to estimate the AoA of the incident RF signal as shown in Equation 4.

Referring back to FIG. 4, in one embodiment, synchronization tone generator 379 of transceiver #2 may generate a constant tone signal with a predetermined phase as the synchronization tone signal to provide to transceiver #1 during the radio synchronization stage instead of transceiver #1 providing to transceiver #2 the phase samples of the incident signal measured by transceiver #1 as the synchronization tone signal during the incident phase measurement stage. Transceiver #1 may measure the phase of the constant tone signal. The phase difference between the constant tone signal transmitted from transceiver #2 and measured by transceiver #1 may be used to estimate the oscillator phase offset $\Delta\varphi_{\#1-\#2}$ between oscillator #1 307 and oscillator #2 309.

Figure 7:
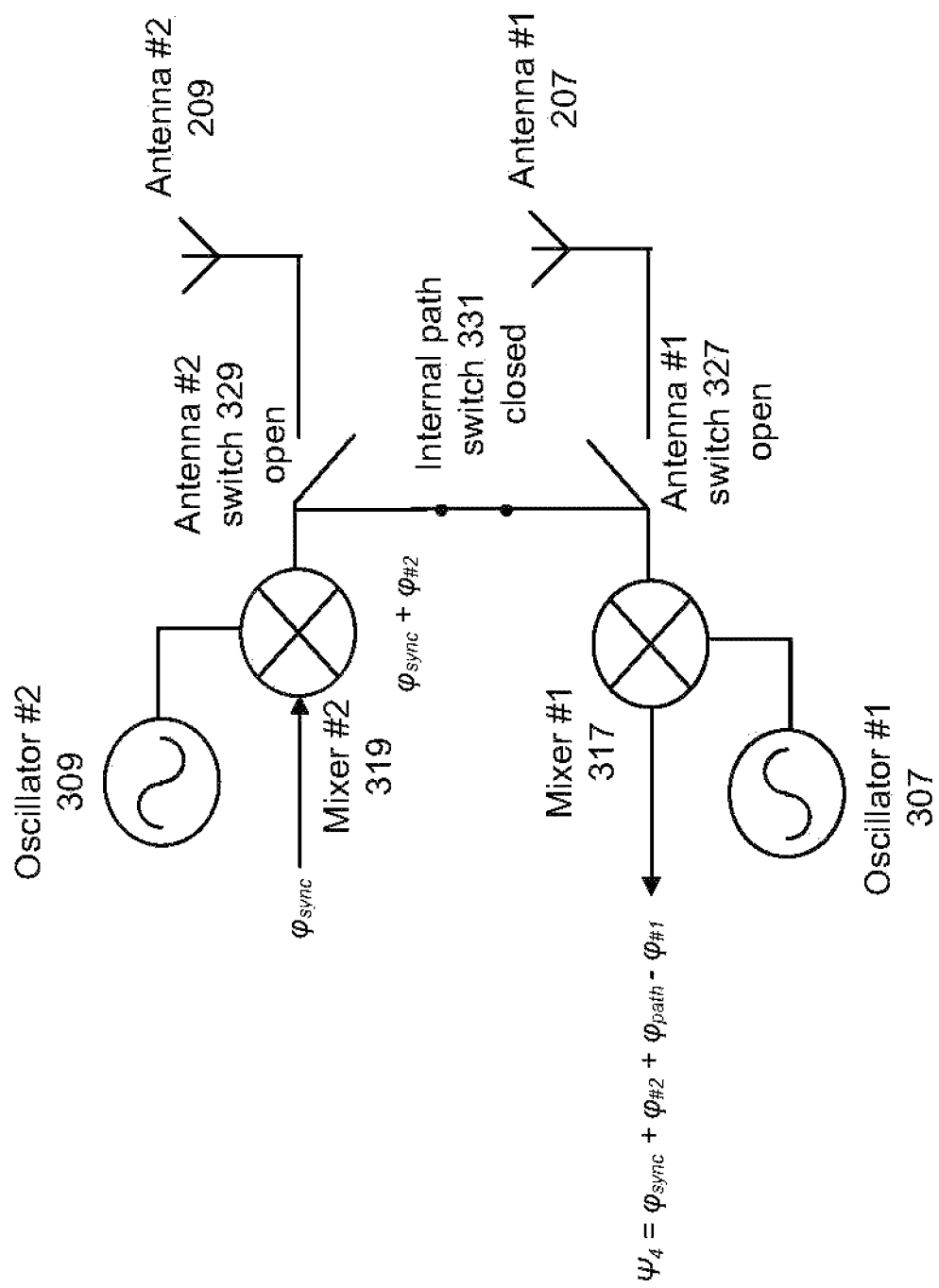
FIG. 7 illustrates a functional block diagram of two unsynchronized radios measuring their oscillator phase offset to estimate AoA of the incident RF signal when the two radios are coupled through an internal path switch through which one radio injects a synchronization tone signal with a predefined phase to the other radio during the radio synchronization stage, in accordance with one aspect of the present disclosure.

FIG. 7 illustrates a functional block diagram of two unsynchronized radios measuring their oscillator phase offset to estimate AoA of the incident RF signal when the two radios are coupled through an internal path switch through which one radio injects a synchronization tone signal with a predefined phase to the other radio during the radio synchronization stage, in accordance with one aspect of the present disclosure. The two radios may be the main radio and the secondary radio of the two transceivers of FIG. 4.

During the radio synchronization stage, mixer #2 319 of the secondary radio may up-convert a constant tone synchronization signal with a predefined phase with the LO generated by oscillator #2 309 to generate the up-converted synchronization signal with phase represented by:

$$\varphi_{sync} + \varphi_{\#2} \qquad \text{(Equation 14)}$$

where $\varphi_{sync}$ represents the predefined phase of the constant tone synchronization signal and $\varphi_{\#2}$ is again the phase offset of the LO from oscillator #2 309.

The up-converted synchronization signal flows through the closed internal path switch 331 of the internal path to the main radio. Mixer #1 317 mixes the up-converted synchronization signal with the LO generated by oscillator #1 307 to generate the measured synchronization signal with phase represented by:

$$\psi_4 = \varphi_{sync} + \varphi_{\#2} + \varphi_{path} - \varphi_{\#1} \qquad \text{(Equation 15)}$$

where $\varphi_{path}$ again represents the phase delay introduced by the internal path, and $\varphi_{\#1}$ is again the phase offset of the LO from oscillator #1 307.

The phase difference between $\varphi_{sync}$ representing the predefined phase samples of the constant tone synchronization signal and $\psi_4$ representing the phase samples of the synchronization signal measured by the main radio is represented by:

$$\psi_5 = \varphi_{sync} - \psi_4 = \varphi_{\#1} - \varphi_{\#2} - \varphi_{path} \qquad \text{(Equation 16)}$$

where $\varphi_{\#1} - \varphi_{\#2} = \Delta\varphi_{\#1-\#2}$ represents the oscillator phase difference between oscillator #1 307 and oscillator #2 309.

As before, $\varphi_{path}$ may be predetermined or characterized to account for temperature sensitivity by expressing it as $\varphi_{path,0}$. The oscillator phase offset may be determined by adding the temperature-dependent internal path phase delay $\varphi_{path,0}$ to Equation 16 represented by:

$$\psi_5 + \varphi_{path,0} = \varphi_{\#1} - \varphi_{\#2} - \varphi_{path} + \varphi_{path,0} \quad \text{(Equation 17)}$$

If the internal path phase delay is compensated fully for its temperature dependency, $\varphi_{path} = \varphi_{path,0}$, and Equation 17 is equal to $\Delta\varphi_{\#1-\#2}$. $\Delta\varphi_{\#1-\#2}$ may be subtracted from Equation 8 representing the phase difference between the phase samples of the incident RF signal measured by the main radio and the secondary radio during the incident phase measurement stage to determine the phase difference $\Delta\varphi$ between the two antennas and to estimate the AoA of the incident RF signal. In one aspect, if the secondary radio has multiple antennas (e.g., 2×2 Wi-Fi), the main radio may also leverage the multiple antennas of the secondary radio for AoA estimation.

Figure 8:
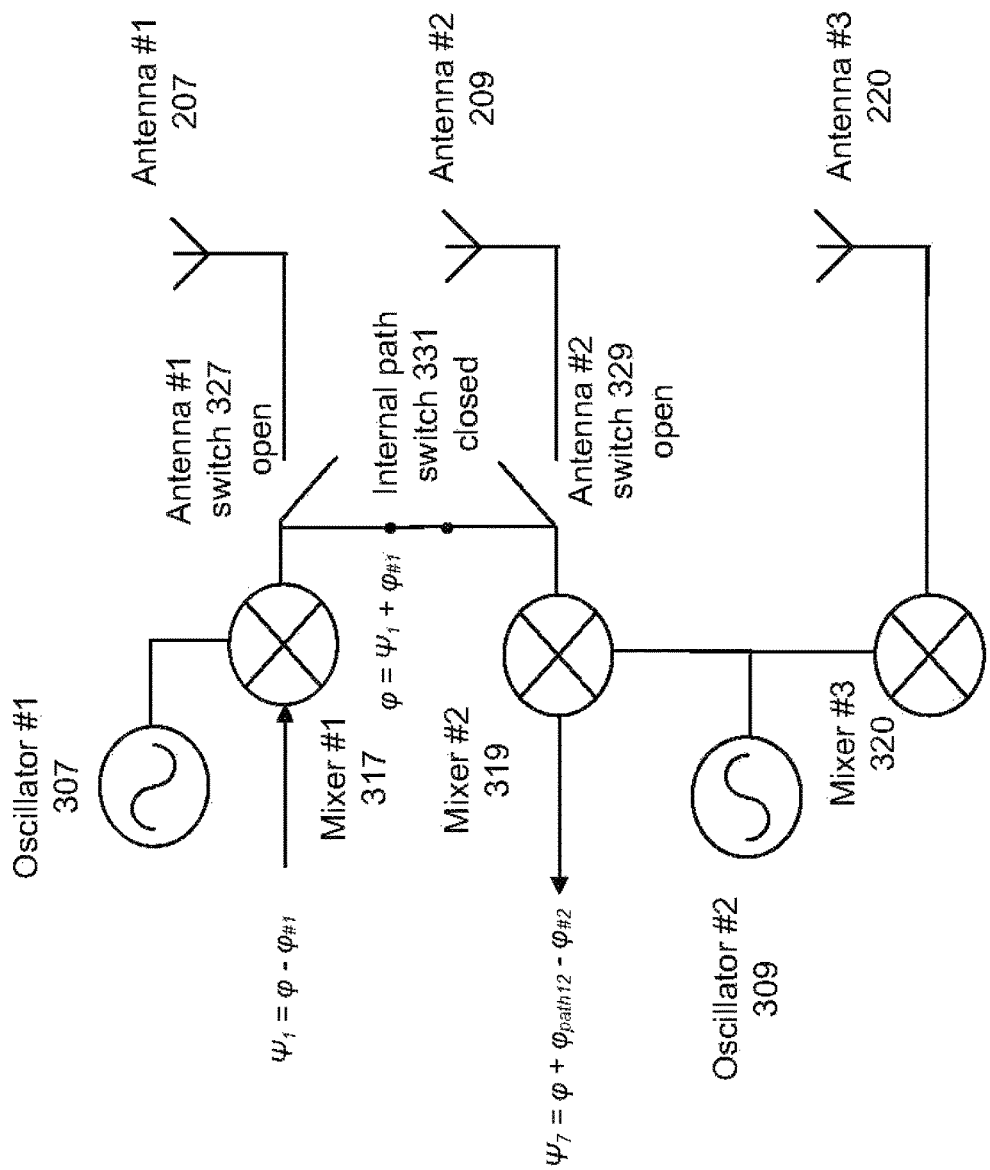
FIG. 8 illustrates a functional block diagram of two unsynchronized radios in which one radio has two antennas and the two radios are coupled through an internal path switch through which one radio injects a synchronization tone signal containing the measured phase samples of an incident wave to the other radio during the radio synchronization stage to compensate their measured phase difference for the oscillator phase offset when estimating the AoA of the incident RF signal, in accordance with one aspect of the present disclosure.

FIG. 8 illustrates a functional block diagram of two unsynchronized radios in which one radio has two antennas and the two radios are coupled through an internal path switch through which one radio injects a synchronization tone signal containing the measured phase samples of an incident wave to the other radio during the radio synchronization stage to compensate their measured phase difference for the oscillator phase offset when estimating the AoA of the incident RF signal, in accordance with one aspect of the present disclosure. The one radio injecting the synchronization tone signal may be the main transceiver of the two transceivers of FIG. 4.

The secondary radio is coupled to two antennas, antenna #2 209 and antenna #3 220. The secondary radio has two mixers, mixer #2 319 and mixer #3 320 to down-convert incident RF signals received by antenna #2 209 and antenna #3 220, using the single LO generated by oscillator #2 309 during the incident phase measurement stage. The incident RF signal from antenna #2 209 is received by mixer #2 319 through antenna #2 switch 329. No antenna switch is inserted between mixer #3 320 and antenna #3 220. The phase of the down-converted signal from mixer #2 319 may be represented by:

$$\psi_6 = \varphi + \Delta\varphi_{12} - \varphi_{\#2} \quad \text{(Equation 18)}$$

where $\varphi$ is the phase of the incident constant tone signal, $\Delta\varphi_{12}$ is the phase difference between antenna #1 207 and antenna #2 209, and ($P\#_2$ is the phase offset of the LO from oscillator #2 309.

During the radio synchronization stage, as in FIG. 6, the main radio may inject the measured phase samples of the down-converted signal $\psi_1 = \varphi - \varphi_{\#1}$ of Equation (5) from the incident phase measurement stage as the synchronization tone signal through mixer #1 317 to generate the up-converted synchronization tone signal $\varphi = \psi_1 + \varphi_{\#1}$.

The up-converted synchronization tone signal flows through the closed internal path switch 331 of the internal path to mixer #2 319 of the secondary radio. Mixer #2 319 mixes the up-converted synchronization tone signal with the LO generated by oscillator #2 309 to generate the tone synchronization signal with phase represented by:

$$\psi_7 = \varphi + \varphi_{path12} - \varphi_{\#2} \quad \text{(Equation 19)}$$

where $\varphi_{path12}$ represents the phase delay introduced by the internal path from the main radio to mixer #2 319.

The phase difference between $\psi_6$ representing the phase samples of the incident constant tone signal measured by mixer #2 319 of the secondary radio and $\psi_7$ representing the phase samples of the tone synchronization signal measured by mixer #2 319 of the secondary radio is represented by:

$$\psi_6 - \psi_7 = \Delta\varphi_{12} - \varphi_{path12} \quad \text{(Equation 20)}$$

$\varphi_{path12}$ may be predetermined or characterized to account for temperature sensitivity by expressing it as $\varphi_{path12,0}$. The phase difference $\Delta\varphi_{12}$ of the incident RF signal between antenna #1 207 and antenna #2 209 may be determined by subtracting the temperature-dependent internal path phase delay $\varphi_{path12,0}$ from Equation 20. $\Delta\varphi_{12}$ may be used to estimate the AoA of the incident RF signal.

In one aspect, the secondary radio coupled to two antennas may determine the phase difference between the two antennas to estimate the AoA of the incident RF signal without involving the antenna of the main radio. The secondary radio may report the AoA estimate to the main radio through a communication interface. The design may be simpler as there is no need for an RF internal path or a radio synchronization stage. The main radio may command the secondary radio through the communication interface to start measurements of the phase difference between the two antennas during the incident phase measurement stage.

Figure 9:
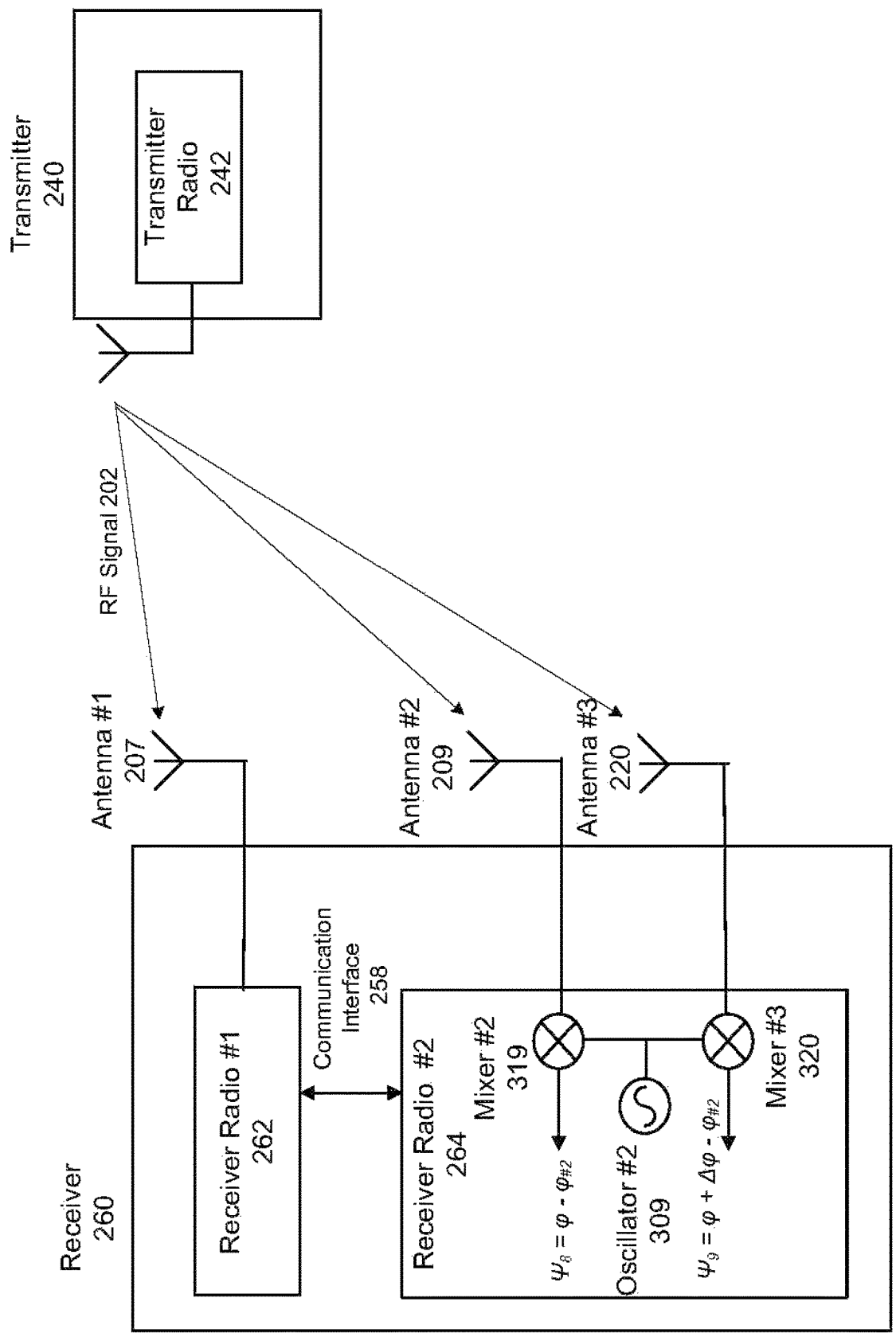
FIG. 9 illustrates a functional block diagram of a radio leveraging a co-located unsynchronized radio that has two antennas for estimating AoA of an incident RF signal without coupling the two radios through an internal RF path, in accordance with one aspect of the present disclosure.

FIG. 9 illustrates a functional block diagram of a radio leveraging a co-located unsynchronized radio that has two antennas for estimating AoA of an incident RF signal without coupling the two radios through an internal RF path, in accordance with one aspect of the present disclosure.

A receiver 260 may have a narrow-band radio #1 262 coupled to antenna #1 207 to receive RF signals 202 transmitted from a transmitter radio 242 of a transmitter 240. RF signals 202 may be a constant tone signal. Receiver 260 may have another narrow-band radio #2 264 is coupled to two antennas, antenna #2 209 and antenna #3 220. Radio #2 264 has two mixers, mixer #2 319 and mixer #3 320 to down-convert incident RF signals received by antenna #2 209 and antenna #3 220, respectively, using the single LO generated by oscillator #2 309 during the incident phase measurement stage. In one aspect, radio #1 262 may be a BLE radio while radio #2 264 may be a 2×2 Wi-Fi radio sharing the ISM band. Radio #1 262 may command radio #2 264 through a communication interface 258 to measure a phase difference between the phase samples of the incident constant tone of RF signals 202 received by antenna #2 209 and antenna #3 220.

The phase of the down-converted incident signal from mixer #2 319 may be represented by:

$$\psi_8 = \varphi - \varphi_{\#2} \quad \text{(Equation 21)}$$

where $\varphi$ is the phase of the incident constant tone signal, and $\varphi_{\#2}$ is the phase offset of the LO from oscillator #2 309.

The phase of the down-converted incident signal from mixer #3 320 may be represented by:

$$\psi_9 = \varphi + \Delta\varphi - \varphi_{\#2} \quad \text{(Equation 22)}$$

where Δφ is the phase difference between antenna #2 209 and antenna #3 220 of radio #2 264.

Radio #2 264 may determine the phase difference between the phase samples measured by mixer #2 319 and mixer #3 320 of radio #2 264 as represented by:

$$\psi_9 - \psi_8 = \Delta\varphi \quad \text{(Equation 23)}$$

Radio #2 264 may report the measured phase difference Δφ between the two antennas to radio #1 262 through communication interface 258 for radio #1 262 to estimate the AoA of the incident RF signal.

Figure 10:
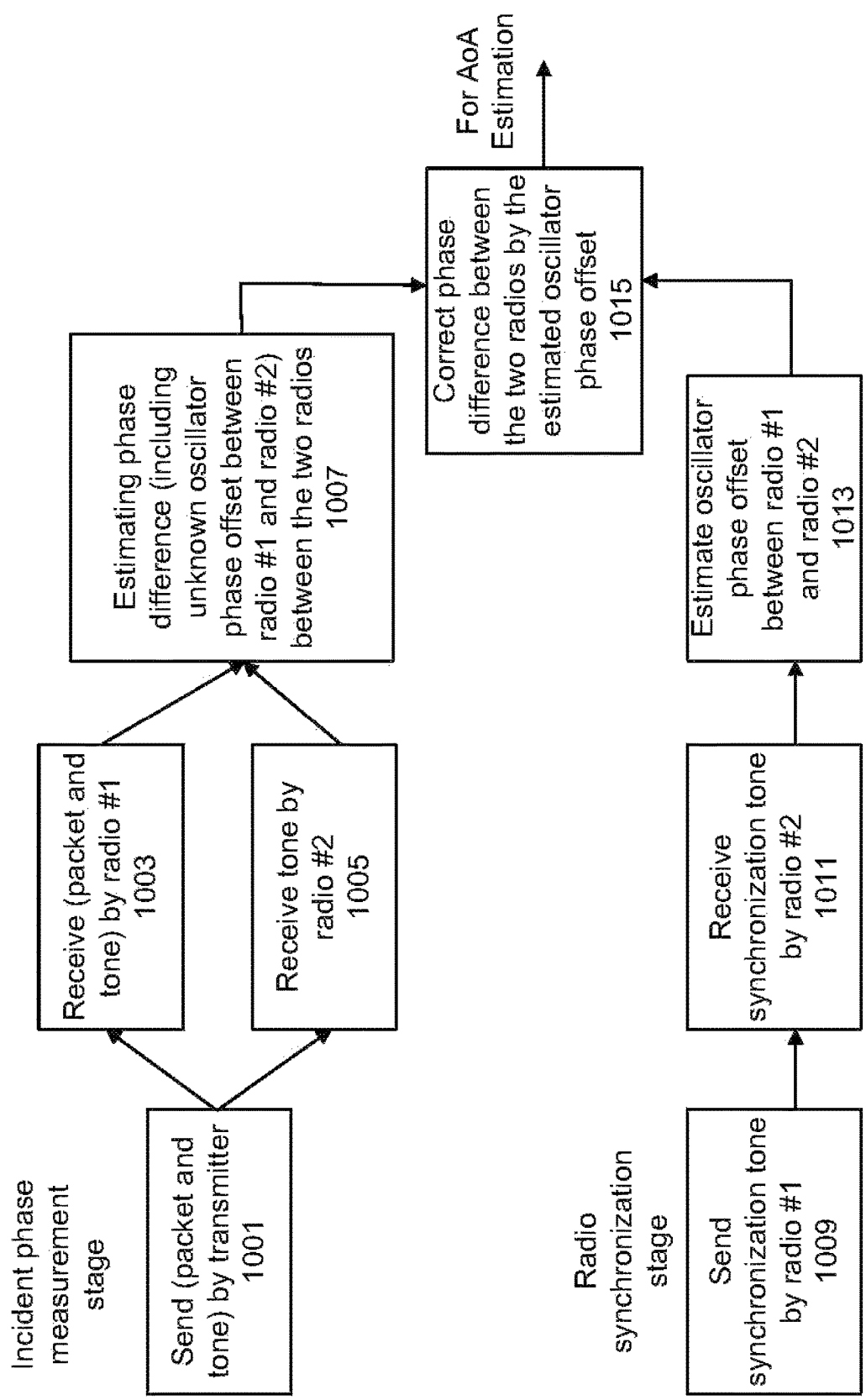
FIG. 10 illustrates the operations of the independent incident phase measurement stage and the radio synchronization stage performed by the receivers of two unsynchronized radios to estimate AoA of an incident RF signal, in accordance with one aspect of the present disclosure.

FIG. 10 illustrates the operations of the independent incident phase measurement stage and the radio synchronization stage performed by the receivers of two unsynchronized radios to estimate AoA of an incident RF signal, in accordance with one aspect of the present disclosure. The incident phase measurement stage and the radio synchronization may be performed in different order but separate in time. In one aspect, radio synchronization may be performed before/after each incident phase measurement or before/after several incident phase measurements. The operations may be performed by the two radios or receivers of FIGS. 2-8.

During operation 1001 of the incident phase measurement stage, a transmitter may transmit a modulated data packet or a constant tone signal on an RF signal.

In operation 1003 of the incident phase measurement stage, radio #1 may receive the data packet or the tone. Radio #1 may measure the phase samples of a constant tone incident signal after the RF signal is down-converted by the LO generated by an oscillator of radio #1, as represented by Equation 5.

In operation 1005 of the incident phase measurement stage, radio #2 may measure the phase samples of the constant tone incident signal after the RF signal is down-converted by the LO generated by an oscillator of radio #2, as represented by Equation 6. Phase measurement of the radio #2 is controlled by the radio #1 using a communication interface (e.g., communication interface 258 of FIG. 2 or FIG. 4).

In operation 1007 of the incident phase measurement stage, radio #1 or radio #2 may estimate the phase difference between the phase samples of the constant tone incident signal measured by the two radios. The estimated phase difference may include an unknown oscillator phase offset between the unsynchronized oscillators of radio #1 and radio #2 in addition to the phase difference of the incident signal received by the two radios, as represented by Equation 8.

In operation 1009 of the radio synchronization stage, radio #1 may transmit a synchronization tone signal to radio #2 through an internal path. In one aspect, the synchronization tone signal may contain the phase samples of the of the constant tone incident signal measured during operation 1003, as represented by Equation 9. In one operation, the synchronization tone signal may be a constant tone signal with a predefined phase, as represented by Equation 14.

In operation 1011 of the radio synchronization stage, radio #2 may measure the phase samples of the synchronization tone signal after it's down-converted by the LO of radio #2, as presented by Equation 10 or Equation 15. Phase measurement of the radio #2 is controlled by the radio #1 using a communication interface (e.g., communication interface 258 of FIG. 2 or FIG. 4).

In operation 1013 of the radio synchronization stage, radio #1 or radio #2 may estimate the oscillator phase offset between the oscillators of radio #1 and radio #2 based on the phase samples of the synchronization tone signal from radio #1 and the phase samples of the synchronization tone signal measured by radio #2, as represented by Equation 17.

In operation 1015 of the radio synchronization stage, radio #1 or radio #2 may correct the phase difference between the phase samples of the constant tone incident signal measured by the two radios during operation 1007 by the estimated oscillator phase offset, as represented by Equation 12 or Equation 13. The corrected phase difference may be used to estimate the AoA of the constant tone incident signal.

Figure 11:
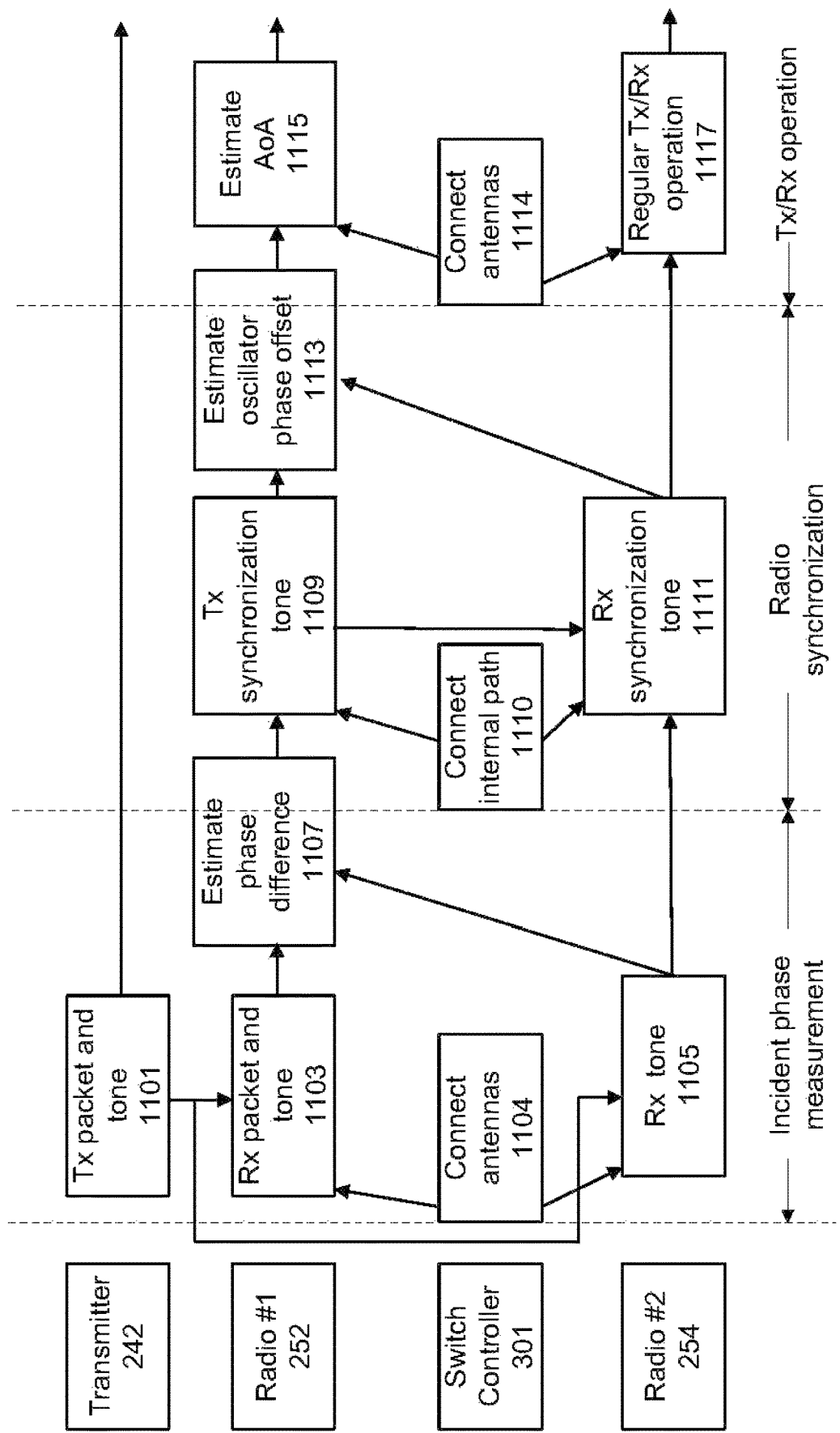
FIG. 11 illustrates a message and data flow diagram of two unsynchronized radios and a switch controller performing the incident phase measurement and the radio synchronization to estimate AoA of a tone signal from a transmitter, in accordance with one aspect of the present disclosure.

FIG. 11 illustrates a message and data flow diagram of two unsynchronized radios and a switch controller performing the incident phase measurement and the radio synchronization to estimate AoA of a tone signal from a transmitter, in accordance with one aspect of the present disclosure. A transmitter 242 may send BLE data packets with tone signals or just tone signals for BLE phase-based ranging used in HADM or PEPS applications. The operations may be performed by radio #1 252 and radio #2 254 of FIGS. 2-8 and switch controller 301 of FIGS. 3-4. In one aspect, radio #1 or the main radio may be a BLE radio and radio #2 or the secondary radio may be a Wi-Fi radio.

During the incident phase measurement stage, in operation 1104, switch controller 301 may connect radio #1 252 and radio #2 254 to their respective antennas through the corresponding antenna switches while opening the internal path switch between the two radios.

In operation 1101, transmitter 242 may transmit a modulated data packet with a constant tone signal or just a constant tone signal on an RF carrier as in operation 1001 of FIG. 10.

In operation 1103, radio #1 252 may receive the data packet with a constant tone signal or just a constant tone signal. Radio #1 252 may measure the phase samples of the constant tone incident signal after the RF signal is down-converted by the LO generated by an oscillator of radio #1 252 as in operation 1003 of FIG. 10.

In operation 1105, radio #2 254 may receive the constant tone signal to measure the phase samples of the constant tone incident signal after the RF signal is down-converted by the LO generated by an oscillator of radio #2 254 as in operation 1005 of FIG. 10.

In operation 1107, radio #1 252 may estimate the phase difference between the phase samples of the constant tone incident signal measured by radio #1 252 and radio #2 254 as in operation 1007 of FIG. 10. The estimated phase difference may include an unknown oscillator phase offset between the unsynchronized oscillators of radio #1 252 and radio #2 254 in addition to the phase difference of the incident signal received by the two radios.

During the radio synchronization stage, in operation 1110, switch controller 301 may connect radio #1 252 and radio #2 254 through the internal path switch and uncouple radio #1 252 and radio #2 254 from their antennas.

In operation 1109, radio #1 252 may transmit a synchronization tone signal to radio #2 254 through the internal path as in operation 1009 of FIG. 10.

In operation 1111, radio #2 254 may receive the synchronization tone signal to measure the phase samples after the synchronization tone signal is down-converted by the LO generated by the oscillator of radio #2 254 as in operation 1011 of FIG. 10.

In operation 1113, radio #2 252 may estimate the oscillator phase offset between the oscillators of radio #1 252 and radio #2 254 based on the phase samples of the synchronization tone signal from radio #1 252 and the phase samples of the synchronization tone signal measured by radio #2 254 as in operation 1013 of FIG. 10.

In operation 1114, switch controller 301 may re-connect radio #1 252 and radio #2 254 to their respective antennas through the corresponding antenna switches while opening the internal path switch between the two radios for normal Tx/Rx operations of radio #1 252 and radio #2 254.

In operation 1115, radio #1 252 may correct the phase difference between the phase samples of the constant tone incident signal measured during operation 1107 by the estimated oscillator phase offset from operation 1113 to estimate the AoA of the constant tone incident signal as in operation 1015 of FIG. 10.

In operation 1117, radio #2 may resume its normal Tx/Rx operation by transmitting or receiving data packets targeted for its targeted wireless technology or communication protocol.

Figure 12:
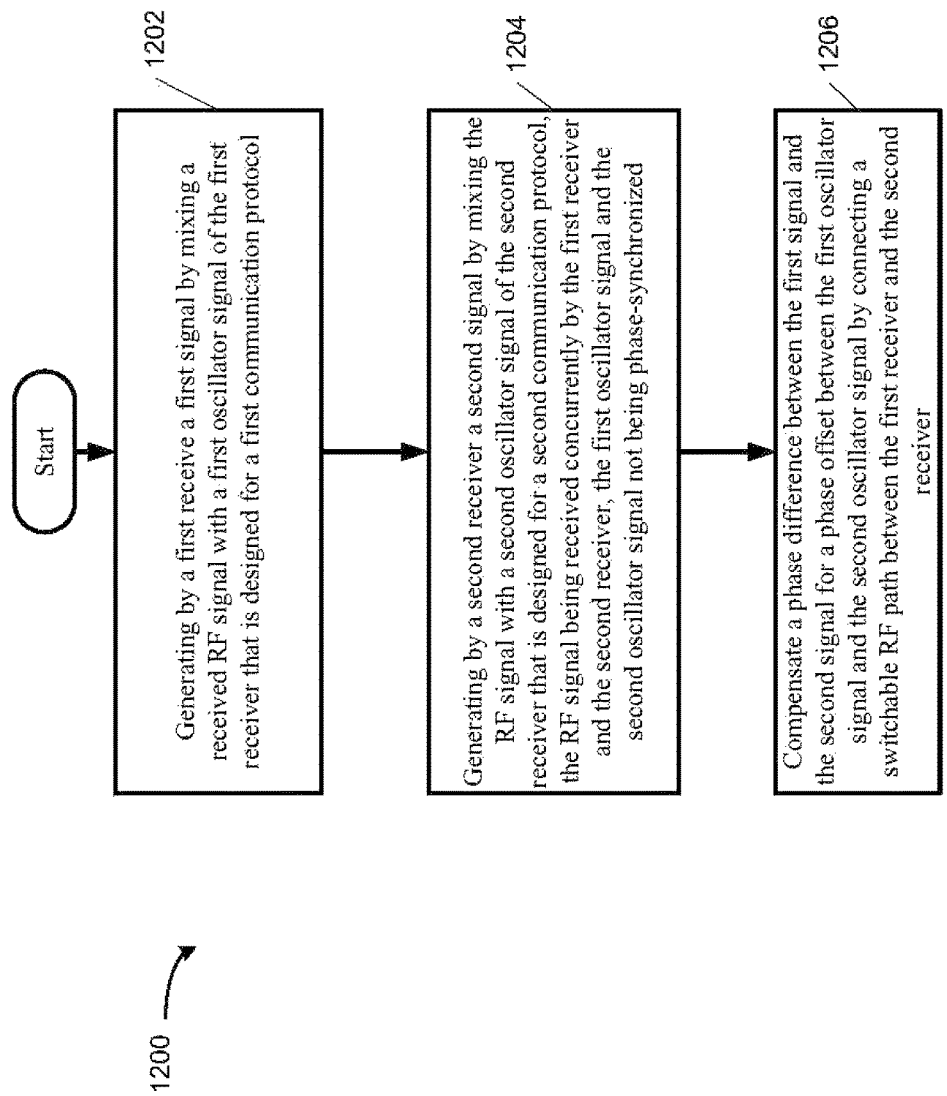
FIG. 12 illustrates a flow diagram of a method for operating two unsynchronized receivers of a device to measure a phase difference of a received signal and to compensate the measured phase difference for an oscillator phase offset between the two receivers, in accordance with one aspect of the present disclosure.

FIG. 12 illustrates a flow diagram of a method 1200 for operating two unsynchronized receivers of a device to measure a phase difference of a received signal and to compensate the measured phase difference for an oscillator phase offset between the two receivers, in accordance with one aspect of the present disclosure. In one aspect, method 1200 may be performed by radios or receivers of FIG. 2-8 utilizing hardware, software, or combinations of hardware and software.

In operation 1202, a first receiver generates a first signal by mixing a received RF signal with a first oscillator signal of the first receiver that is designed for a first communication protocol.

In operation 1204, a second receiver generates a second signal by mixing the RF signal with a second oscillator signal of the second receiver that is designed for a second communication protocol. The RF signal is received concurrently by the first receiver and the second receiver. The first oscillator signal and the second oscillator signal are not phase-synchronized.

In operation 1206, the method compensates a phase difference between the first signal and the second signal for a phase offset between the first oscillator signal and the second oscillator signal by connecting a switchable RF path between the first receiver and the second receiver.

Various embodiments of the multi-carrier phase-based ranging system described herein may include various operations. These operations may be performed and/or controlled by hardware components, digital hardware and/or firmware/programmable registers (e.g., as implemented in computer-readable medium), and/or combinations thereof. The methods and illustrative examples described herein are not inherently related to any particular device or other apparatus. Various systems (e.g., such as a wireless device operating in a near field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operations by a plurality of receivers, the method comprising:
generating, by a first receiver, a first signal by mixing a received radio frequency (RF) signal with a first oscillator signal of the first receiver that is designed for a first communication protocol, the generating the first signal comprising connecting the first receiver to a first antenna through a switchable first antenna path;
generating, by a second receiver, a second signal by mixing the RF signal with a second oscillator signal of the second receiver that is designed for a second communication protocol, the generating the second signal comprising connecting the second receiver to a second antenna through a switchable second antenna path, the first oscillator signal and the second oscillator signal not being phase-synchronized, the generating the first signal and the second signal comprising disconnecting a switchable RF path between the first receiver and the second receiver to receive the RF signal concurrently by the first receiver and the second receiver; and
compensating a phase difference between the first signal and the second signal for a phase offset between the first oscillator signal and the second oscillator signal by connecting the switchable RF path between the first receiver and the second receiver, disconnecting the first receiver from the first antenna through the switchable first antenna path, and disconnecting the second receiver from the second antenna through the switchable second antenna path.

2. The method of claim 1, wherein compensating the phase difference between the first signal and the second signal for the phase offset between the first oscillator signal and the second oscillator signal comprises:
generating a synchronization tone signal by the first receiver;
providing the synchronization tone signal from the first receiver to the second receiver through the switchable RF path; and
generating by the second receiver a third signal by mixing the synchronization tone signal with the second oscillator signal.

3. The method of claim 2, wherein the synchronization tone signal comprises the first signal, and wherein compensating the phase difference between the first signal and the second signal for the phase offset between the first oscillator signal and the second oscillator signal further comprises:
determining a phase difference between the second signal and the third signal; and
compensating the phase difference between the second signal and the third signal for a phase delay caused by the switchable RF path to generate a compensated phase difference between the first signal and the second signal.

4. The method of claim 3, further comprising:
receiving the RF signal by the first receiver through a first antenna to generate the first signal;
receiving the RF signal concurrently by the second receiver through a second antenna to generate the second signal; and
estimating an angle of arrival (AoA) of the RF signal received through the first antenna and the second antenna based on the compensated phase difference between the first signal and the second signal.

5. The method of claim 3, wherein the phase delay caused by the switchable RF path comprises a known delay that depends on an operating temperature of the switchable RF path.

6. The method of claim 2, wherein the synchronization tone signal comprises a predefined IF signal having a known phase, and wherein compensating the phase difference between the first signal and the second signal for the phase offset between the first oscillator signal and the second oscillator signal further comprises:
determining a phase of the third signal; and
compensating a phase difference between the known phase and the phase of the third signal for a phase delay caused by the switchable RF path to estimate the phase offset between the first oscillator signal and the second oscillator signal.

7. The method of claim 6, wherein compensating the phase difference between the first signal and the second signal for the phase offset between the first oscillator signal and the second oscillator signal further comprises:
receiving the RF signal by the first receiver through a first antenna to generate the first signal;
receiving the RF signal concurrently by the second receiver through a second antenna to generate the second signal;
determining an uncompensated phase difference between the first signal and the second signal;
compensating the uncompensated phase difference for the estimated phase offset between the first oscillator signal and the second oscillator signal to generate a compensated phase difference between the first signal and the second signal; and
estimating an angle of arrival (AoA) of the RF signal received through the first antenna and the second antenna based on the compensated phase difference between the first signal and the second signal.

8. The method of claim 1, wherein the first communication protocol and the second communication protocol comprise different communication protocols, and wherein the RF signal received concurrently by the first receiver and the second receiver comprises one of a Bluetooth Low Energy (BLE) signal or a Wi-Fi signal.

9. An apparatus comprising:
a first receiver configured to mix a received radio frequency (RF) signal with a first oscillator signal of the first receiver to generate a first signal, and communicate a synchronization tone signal, wherein the first receiver is designed for a first communication protocol;

a second receiver configured to mix the received RF signal with a second oscillator signal of the second receiver to generate a second signal, wherein the second receiver is designed for a second communication protocol different from the first communication protocol, wherein the RF signal is received concurrently by the first receiver and the second receiver, and wherein the first oscillator signal and the second oscillator signal are not phase-synchronized;

a switchable RF path between the first receiver and the second receiver, wherein the second receiver is configured to communicate the synchronization tone signal through the switchable RF path and mix the synchronization tone signal with the second oscillator signal to generate a third signal; and a controller configured to control the switchable RF path to enable the first receiver or the second receiver to compensate a phase difference between the first signal and the second signal for a phase offset between the first oscillator signal and the second oscillator signal.

10. The apparatus of claim 9, wherein the controller is further configured to:

connect the first receiver to a first antenna through a switchable first antenna path to receive the RF signal;

connect the second receiver to a second antenna through a switchable second antenna path to receiver the RF signal; and disconnect the switchable RF path between the first receiver and the second receiver when the first receiver and the second receiver concurrently receive the RF signal.

11. The apparatus of claim 10, wherein the controller is further configured to:

disconnect the first receiver from the first antenna through the switchable first antenna path;

disconnect the second receiver from the second antenna through the switchable second antenna path; and connect the switchable RF path between the first receiver and the second receiver to enable the first receiver or the second receiver to compensate the phase difference between the first signal and the second signal for the phase offset between the first oscillator signal and the second oscillator signal.

12. The apparatus of claim 9, wherein the synchronization tone signal comprises the first signal, and wherein the second receiver is further configured to:

determine a phase difference between the second signal and the third signal; and compensate the phase difference between the second signal and the third signal for a phase delay caused by the switchable RF path to generate a compensated phase difference between the first signal and the second signal; and communicate the compensated phase difference between the first signal and the second signal to the first receiver through a communication interface.

13. The apparatus of claim 12, wherein the first receiver is further configured to:

receive the RF signal through a first antenna to generate the first signal; and wherein the second receiver is further configured to:

receive the RF signal concurrently through a second antenna to generate the second signal, and wherein the first receiver or the second receiver is further configured to:

estimate an angle of arrival (AoA) of the RF signal received through the first antenna and the second antenna based on the compensated phase difference between the first signal and the second signal.

14. The apparatus of claim 12, wherein the phase delay caused by the switchable RF path comprises a known delay that depends on an operating temperature of the switchable RF path.

15. The apparatus of claim 9, wherein the synchronization tone signal comprises a predefined IF signal having a known phase, and wherein the second receiver is further configured to:

determine a phase of the third signal; and compensate a phase difference between the known phase and the phase of the third signal for a phase delay caused by the switchable RF path to estimate the phase offset between the first oscillator signal and the second oscillator signal.

16. The apparatus of claim 15, wherein the first receiver is further configured to:

receive the RF signal through a first antenna to generate the first signal;

wherein the second receiver is further configured to:

receive the RF signal concurrently through a second antenna to generate the second signal, and wherein the first receiver or the second receiver is further configured to:

determine an uncompensated phase difference between the first signal and the second signal;

compensate the uncompensated phase difference for the estimated phase offset between the first oscillator signal and the second oscillator signal to generate a compensated phase difference between the first signal and the second signal; and estimate an angle of arrival (AoA) of the RF signal received through the first antenna and the second antenna based on the compensated phase difference between the first signal and the second signal.

17. A wireless system comprising:

a first antenna configured to receive a radio frequency (RF) signal;

a first receiver coupled to the first antenna through a switchable first antenna path and configured to mix the RF signal with a first oscillator signal of the first receiver to generate a first signal, wherein the first receiver is designed for a first communication protocol;

a second antenna configured to receive concurrently the RF signal;

a second receiver coupled to the second antenna through a switchable second antenna path and configured to mix the RF signal with a second oscillator signal of the second receiver to generate a second signal, wherein the second receiver is designed for a second communication protocol different from the first communication protocol, and wherein the first oscillator signal and the second oscillator signal are not phase-synchronized;

a switchable RF path between the first receiver and the second receiver; and a controller configured to:

control the switchable RF path, the switchable first antenna path, and the switchable second antenna path to compensate, using a synchronization signal communicated between the first receiver and the second receiver via the switchable RF path, a phase difference between the first signal and the second signal for a phase offset between the first oscillator signal and the second oscillator signal; and estimate an angle of arrival (AoA) of the RF signal received concurrently through the first antenna and the second antenna based on the phase difference between the first signal and the second signal compensated for the phase offset between the first oscillator signal and the second oscillator signal.

* * * * *